(12) United States Patent
Spencer et al.

(10) Patent No.: US 9,670,064 B1
(45) Date of Patent: *Jun. 6, 2017

(54) PRODUCTION OF HEAVY WATER

(71) Applicant: Consolidated Nuclear Security, LLC, Reston, VA (US)

(72) Inventors: Larry S. Spencer, Knoxville, TN (US); Sam W. Brown, Knoxville, TN (US); Michael R. Phillips, Harriman, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 802 days.

This patent is subject to a terminal disclaimer.

(21) Appl. No.: 13/628,186

(22) Filed: Sep. 27, 2012

(51) Int. Cl.
   *C01B 5/02*   (2006.01)
   *B01J 10/00*  (2006.01)
   *C25B 1/00*   (2006.01)

(52) U.S. Cl.
   CPC .............. *C01B 5/02* (2013.01); *B01J 10/007* (2013.01); *C25B 1/00* (2013.01)

(58) Field of Classification Search
   None
   See application file for complete search history.

(56) References Cited

U.S. PATENT DOCUMENTS

| | | | |
|---|---|---|---|
| 2,908,554 A * | 10/1959 | Hoogschagen | C01B 4/00 423/580.2 |
| 3,399,967 A | 9/1968 | Pogorski | |
| 3,431,080 A | 3/1969 | Rostaing | |
| 3,514,382 A | 5/1970 | Stevens | |
| 3,888,974 A | 6/1975 | Stevens | |
| 3,974,048 A | 8/1976 | Hammerli et al. | |
| 4,504,460 A | 3/1985 | Mandrin | |
| 5,084,181 A | 1/1992 | Van Hook et al. | |
| 6,858,190 B2 | 2/2005 | Graham | |

(Continued)

FOREIGN PATENT DOCUMENTS

| | | | | |
|---|---|---|---|---|
| GB | 2110949 A | * | 6/1983 | ............... B01J 8/04 |
| JP | 56121640 A | * | 9/1981 | |
| WO | WO 2007132045 A1 | * | 11/2007 | |

OTHER PUBLICATIONS

Fookson, Abraham et al., Preparation and Purification of Hydrogen Deuteride, Journal of Research of the National Bureau of Standards, vol. 47, No. 1 (Jul. 1951) 31-34.*

(Continued)

*Primary Examiner* — Melissa Swain
(74) *Attorney, Agent, or Firm* — Luedeka Neely Group, PC; Michael J. Renner, Esq.

(57) ABSTRACT

Disclosed are methods and apparatuses for producing heavy water. In one embodiment, a catalyst is treated with high purity air or a mixture of gaseous nitrogen and oxygen with gaseous deuterium all together flowing over the catalyst to produce the heavy water. In an alternate embodiment, the deuterium is combusted to form the heavy water. In an alternate embodiment, gaseous deuterium and gaseous oxygen is flowed into a fuel cell to produce the heavy water. In various embodiments, the deuterium may be produced by a thermal decomposition and distillation process that involves heating solid lithium deuteride to form liquid lithium deuteride and then extracting the gaseous deuterium from the liquid lithium deuteride.

5 Claims, 9 Drawing Sheets

(56) References Cited

U.S. PATENT DOCUMENTS

| | | | |
|---|---|---|---|
| 8,679,224 B2* | 3/2014 | Brown | B01D 53/22 423/646 |
| 2004/0248735 A1 | 12/2004 | Li et al. | |
| 2009/0029202 A1* | 1/2009 | Hossain et al. | 429/16 |
| 2011/0027165 A1 | 2/2011 | Stuart et al. | |

OTHER PUBLICATIONS

Zhang, Jianzhong et al., Thermal equations of State and Melting of Lithium Deuteride under High Pressure, Journal of Applied Physics, 103 (May 2008).*

Ruffa, A.R., Thermal Expansion and Zero-point Displacement in Isotopic Lithium Hydride, Physical Review B, vol. 27, No. 2, (Jan. 1983).*

* cited by examiner

PRODUCTION OF HEAVY WATER

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This disclosure relates to the field of production of heavy water. More particularly, this disclosure relates to production of heavy water from deuterium and oxygen.

BACKGROUND

"Ordinary" hydrogen (H) has a nucleus consisting of one proton and it has an atomic weight of 1. However, there is also an isotope of hydrogen that has a nucleus consisting of one proton and one neutron. This isotope is called deuterium, and chemical reference materials commonly use either the symbol "D" or the symbol "$^2$H" to represent deuterium. Deuterium has an atomic weight of 2, and it is often referred to as heavy hydrogen.

Deuterium occurs in nature, but only in very small quantities compared with ordinary hydrogen. Nonetheless, because of deuterium's presence in nature, and because it is an isotope of ordinary hydrogen, the atomic weight of hydrogen is typically listed in reference charts and tables as slightly greater than one, which reflects the weighted average of ordinary hydrogen and deuterium as they occur in nature. Various processes are known in the art for separating the isotopes of hydrogen such that concentrations of deuterium may be produced.

Water molecules may be formed either with ordinary hydrogen or with deuterium. The term "ordinary water" is generally used to refer to a compound of oxygen and ordinary hydrogen, or a compound made from oxygen and hydrogen composed of oxygen with ordinary hydrogen mixed with a naturally-occurring amount of deuterium. When deuterium in a form that is concentrated above naturally-occurring proportions is compounded with hydrogen, the resulting compound is referred to as "hydrogen deuteride" or (more commonly) referred to as "heavy water." Ordinary water is typically denoted by the chemical symbol "$H_2O$," whereas heavy water is typically denoted either by the chemical symbol "$D_2O$" or "$^2H_2O$."

Heavy water is used as a neutron moderator and a coolant for nuclear power reactors that use natural uranium as a fuel. Heavy water is also a convenient storage media for deuterium, which is used as a fuel in nuclear fusion reactors, as a wave length shifting material in laser applications, and in various scientific research applications. Heavy water is typically made by isotopically enriching the percentage of hydrogen deuteride in ordinary water using various chemical or thermal enrichment processes. These are generally quite expensive and slow processes. What is needed therefore are improved methods of manufacturing heavy water.

SUMMARY

In one embodiment, the present disclosure provides a method of producing heavy water where the method involves treating a catalyst with an inert gas and gaseous oxygen to produce an oxygenated catalyst. In preferred embodiments, the inert gas is nitrogen. In this embodiment, gaseous deuterium, and optionally a second inert gas is flowed over the oxygenated catalyst, to produce gaseous heavy water, and the gaseous heavy water is condensed to produce liquid or solid heavy water.

In an alternate embodiment, gaseous deuterium and gaseous oxygen are combusted to produce gaseous heavy water, and the gaseous heavy water is condensed to produce liquid or solid heavy water.

In an alternate embodiment, heavy water is produced by flowing gaseous deuterium and gaseous oxygen into a fuel cell, and then extracting liquid heavy water from the fuel cell.

Various embodiments may involve heating solid lithium deuteride to form liquid lithium deuteride and extracting the gaseous deuterium from the liquid lithium deuteride.

Further disclosed is an apparatus for producing heavy water including a catalytic reactor that contains an oxygenated catalyst. A thermal decomposition and distillation apparatus is provided, having a hot zone to heat solid-phase lithium deuteride to form liquid-phase lithium deuteride. There is a vacuum system to extract gaseous deuterium from the liquid-phase lithium deuteride and to flow the gaseous deuterium into the catalytic reactor wherein gaseous heavy water is produced. Typically, a condenser is provided to condense the gaseous heavy water to liquid or solid heavy water.

A further apparatus embodiment for producing heavy water has a combustion chamber, and there is a thermal decomposition and distillation apparatus having a hot zone to heat solid-phase lithium deuteride to form liquid-phase lithium deuteride. A vacuum system is provided to extract gaseous deuterium from the liquid-phase lithium deuteride and to flow the gaseous deuterium into the combustion chamber wherein gaseous heavy water is produced. A condenser is generally provided to condense the gaseous heavy water to liquid or solid heavy water.

A further embodiment of an apparatus for producing heavy water includes a fuel cell, with a source of oxygen for the fuel cell. Also provided in this embodiment is a thermal decomposition and distillation apparatus having a hot zone to heat solid-phase lithium deuteride to form liquid-phase lithium deuteride. A vacuum system is provided to extract gaseous deuterium from the liquid-phase lithium deuteride and to flow the gaseous deuterium into the fuel cell wherein liquid heavy water is produced.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
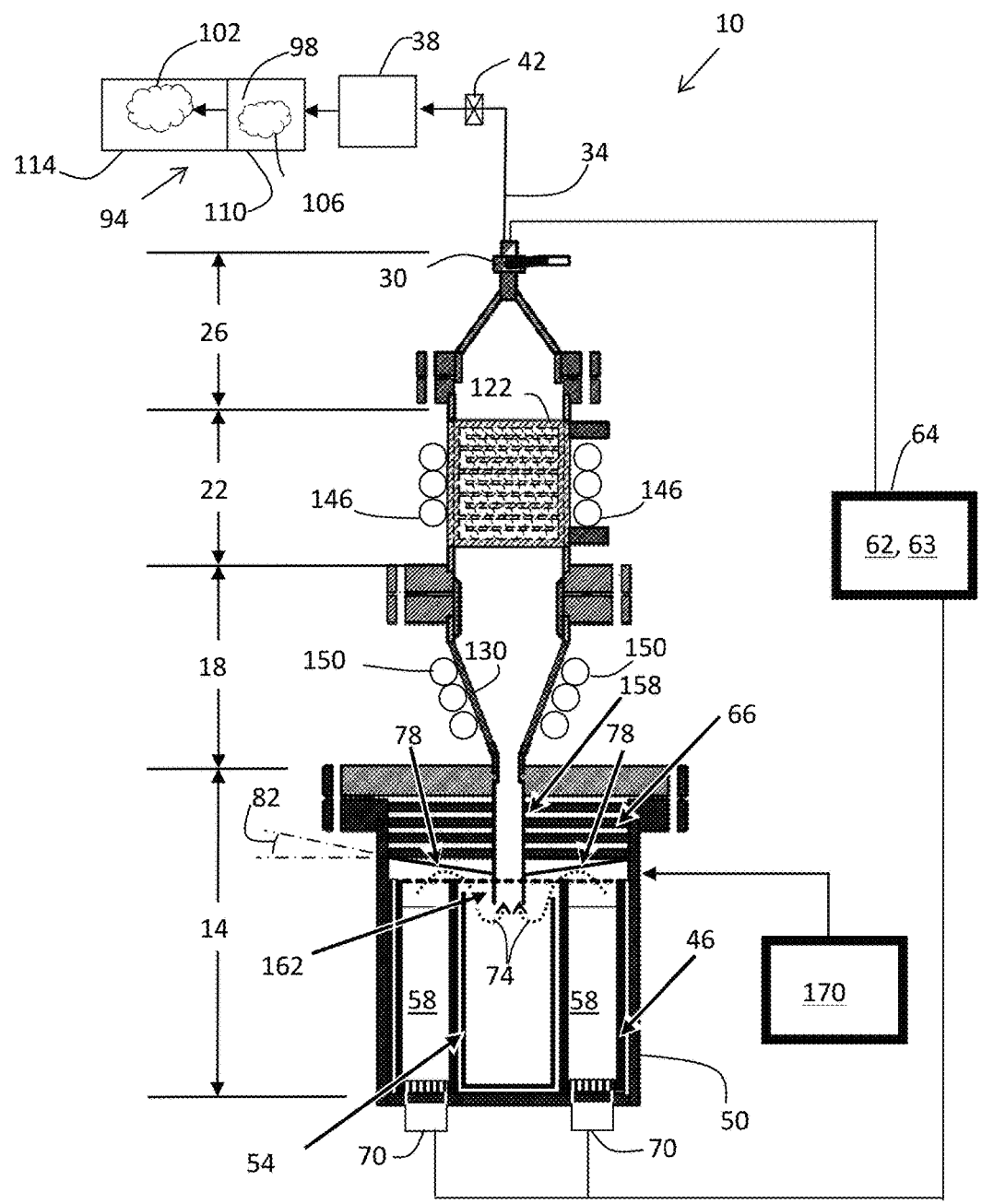
FIG. 1 is a somewhat schematic cross-sectional view of a thermal decomposition and distillation apparatus for processing deuterium and lithium materials.

In the following detailed description of the preferred and other embodiments, reference is made to the accompanying drawings, which form a part hereof, and within which are shown by way of illustration the practice of specific embodiments of methods of procuring heavy water. It is to be understood that other embodiments may be utilized, and that structural changes may be made and processes may vary in other embodiments.

Lithium hydride (LiH) reacts with water to produce hydrogen gas and lithium hydroxide. Although this is a violent reaction, it was used in World War II to provide a lightweight source of hydrogen to inflate signaling balloons. Lithium hydride is a very space-efficient material for the storage of hydrogen. The hydrogen density in lithium hydride is greater than the density of metallic (solid) hydrogen. In other words there is more hydrogen stored in a cubic unit measure of lithium hydride than in the same cubic unit measure of pure metallic hydrogen. This phenomenon provides a potential for the use of lithium hydride as a means of compact storage of hydrogen for use in hydrogen-powered vehicles and other applications where a source of hydrogen on demand is needed.

The term "lithium hydride" is generally used to refer to a compound of lithium and ordinary hydrogen, or a compound made from lithium and hydrogen composed of ordinary hydrogen mixed with a naturally-occurring amount of deuterium. When deuterium in a form that is concentrated above naturally-occurring proportions is compounded with lithium, the resulting compound is generally referred to as lithium deuteride. Similarly, as previously-noted herein, when deuterium in a form that is concentrated above naturally-occurring proportions is compounded with hydrogen, the resulting compound is referred to as "hydrogen deuteride" or, more commonly, is referred to as "heavy water."

When it is helpful or necessary to distinguish lithium hydride that formed as a compound of lithium from ordinary hydrogen and lithium deuteride, the former compound is represented by the chemical symbol $L^1H$ and the latter compound is represented either by the symbol $L^2H$ or LD. As an ancillary consideration, lithium also occurs in different isotopic forms ($^6Li$ and $^7Li$). However, that distinction is not relevant to the present disclosure because either isotope of lithium (or any combination of the two isotopes of lithium) may be compounded with deuterium and used with equal effectiveness for the production of heavy hydrogen and heavy water using the processes disclosed herein.

At atmospheric pressure, lithium deuteride melts at about 692° C. By reducing the ambient pressure to near vacuum conditions, lithium deuteride may be melted at about 680° C. At atmospheric pressure, liquid lithium deuteride decomposes into lithium metal and deuterium gas at about 850° C. The temperature at which the decomposition occurs may be lowered to about 750° C. by reducing the ambient pressure over the liquid lithium deuteride to near vacuum conditions. These characteristics may be used in thermal processes to generate deuterium from lithium deuteride with relative safety compared with a chemical reaction of water with lithium deuteride. Such thermal processes have a further advantage of producing lithium metal instead of the lithium hydroxide that results from the chemical reaction of water with lithium deuteride. Typically, many impurities in the lithium deuteride are removed during these thermal processes such that a refined lithium metal is produced. In addition, such thermal processes may be extended to economically produce high purity lithium deuteride by "re-hydriding" the refined lithium metal with deuterium.

FIG. 1 illustrates a thermal decomposition and distillation apparatus 10 that may be used to generate deuterium and lithium metal, as well as to produce high purity lithium and high purity lithium deuteride. The thermal decomposition and distillation apparatus 10 may also be used to store deuterium and release the stored deuterium for subsequent use. The thermal decomposition and distillation apparatus 10 provides a hot zone 14, a moderate zone 18, a cold zone 22, and an extraction zone 26. The thermal decomposition and distillation apparatus 10 also includes a vacuum system 38 that is connected by an extraction line 34 to the top of the extraction zone 26 through a manifold 30. Typically, the vacuum system 38 is an oil-free vacuum pump. A valve 42 is typically provided in the extraction line 34 to permit sealing off the vacuum system 38 from the extraction zone 26.

In the embodiment of the thermal decomposition and distillation apparatus 10 depicted in FIG. 1, the hot zone 14 includes a shim pot 46 that is disposed within a process vessel 50. A "shim pot" is a double-walled vessel with a space between the walls for containing materials. In the embodiment of FIG. 1, a lithium deuteride source material 58 is disposed between the walls of the shim pot 46. In the embodiment of the thermal decomposition and distillation apparatus 10 depicted in FIG. 1, a center can 54 is disposed within the open space formed by the inner wall of the shim pot 46. The shim pot 46 and the center can 54 are preferably constructed from a material such as iron that is resistant to corrosion when in contact with hot lithium. In some embodiments the shim pot 46 is not used and the lithium deuteride source material 58 is disposed between the process vessel 50 and the center can 54. In such embodiments, the process vessel 50 is preferably constructed from a material such as iron that is resistant to corrosion when in contact with lithium. In embodiments where a shim pot is used (such as shim pot 46), the process vessel 50 may be constructed from stainless steel, which could be susceptible to corrosion if contacted with hot lithium were it not for the protection against such corrosion that is provided by the shim pot 46. Typically, the shim pot 46, the process vessel 50, and the center can 54 are concentric circular annular shapes.

The lithium deuteride source material 58 is substantially lithium deuteride, but the lithium deuteride source material 58 may include up to ten percent impurities that are not lithium-hydride. That is, the lithium deuteride content may be in a range from about ninety to one hundred percent of the lithium deuteride source material 58.

Typically, the operation of the thermal decomposition and distillation apparatus 10 begins with establishing a flow of purge gas 62 such as argon from a tank 64 through the manifold 30. Then, the vacuum system 38 is activated with the valve 42 open. The purge flow tends to reduce the flow of dust from the lithium deuteride source material 58 into the vacuum system 38. The process vessel 50, the shim pot 46 (if used), and the center can 54 are then heated with an appropriate energy source (e.g., electric resistance, induction, natural gas). The hot zone 14 is kept under dynamic vacuum by the vacuum system 38 as the temperature is increased. The term "dynamic vacuum" means that the hot zone 14 is being continually pumped by the vacuum system 38 (i.e., it is not just pumped to vacuum and then valved off, leaving a trapped vacuum condition). This active pumping removes the purge gas 62 and any off-gasses from the lithium deuteride source material 58. Heating continues until the lithium deuteride source material 58 reaches at least 680° C., which is the melting temperature of lithium deuteride at reduced atmosphere. Radiation baffles 66 are provided in the embodiment of FIG. 1 to reduce the heat loss through the top of the hot zone 14. Even so, when the bottom of the hot zone 14 is at 680° C. or greater, the temperature at the top of the hot zone 14 may be significantly lower such as only 400° C. This is acceptable. Once the lithium deuteride source material 58 is melted, the flow of purge gas 62 (e.g., argon through the manifold 30) may be discontinued.

As this process proceeds, a barrier crust may form above the liquid-phase lithium deuteride in the shim pot 46 (or in the process vessel 50 if the shim pot 46 is not used). The barrier crust is a slag-like material that may be formed from impurities in the lithium deuteride, from lithium hydroxide formed from lithium deuteride reacting with trace amounts of water vapor in the thermal decomposition and distillation apparatus 10, and/or from other contaminants. The barrier crust slows down the evolution of deuterium from the liquid-phase lithium deuteride. To overcome this, FIG. 1 illustrates that the thermal decomposition and distillation apparatus 10 may include an agitator 70 for retarding the formation of the barrier crust. In some embodiments, the agitator 70 may comprise an inert gas sparge 63, such as a gas sparge using a flow of the purge gas 62 that was discontinued as a purge gas when the lithium deuteride source material 58 melted. Such a sparge flow substantially retards the formation of the barrier crust above the molten phase. In some embodiments, the agitator 70 may comprise an energy source having a periodic waveform (such as ultrasonic vibration) that is applied to the bottom of the shim pot 46 to retard the development of a barrier crust. In embodiments that do not employ the shim pot 46, the agitator 70 is applied at the bottom of the process vessel 50 between the process vessel 50 and the center can 54.

Figure 2:
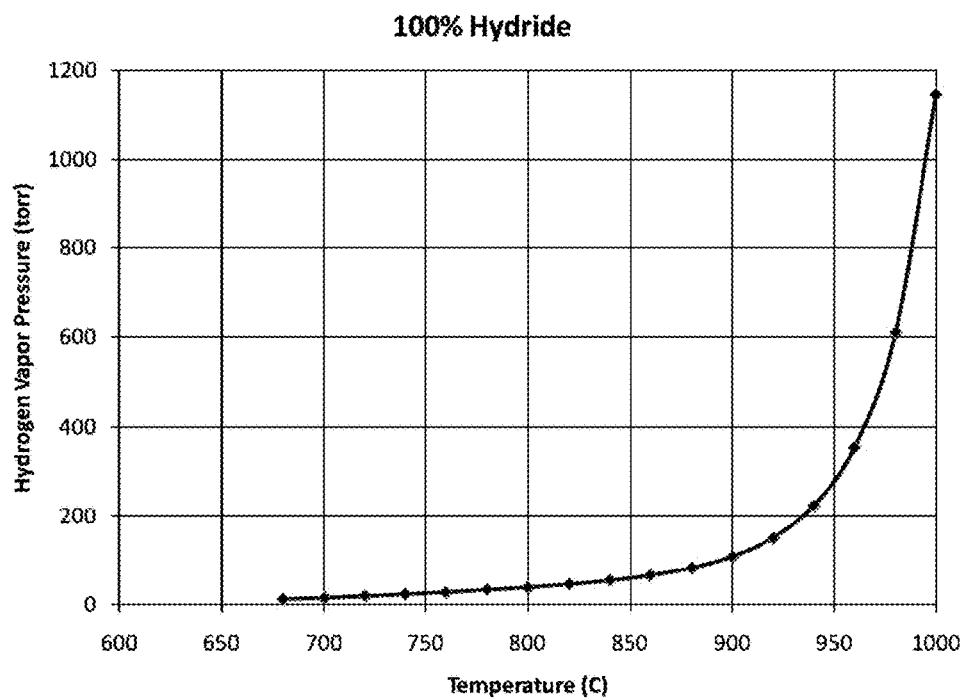
FIG. 2 is a vapor pressure curve for deuterium in lithium deuteride as a function of temperature.
Figure 3:
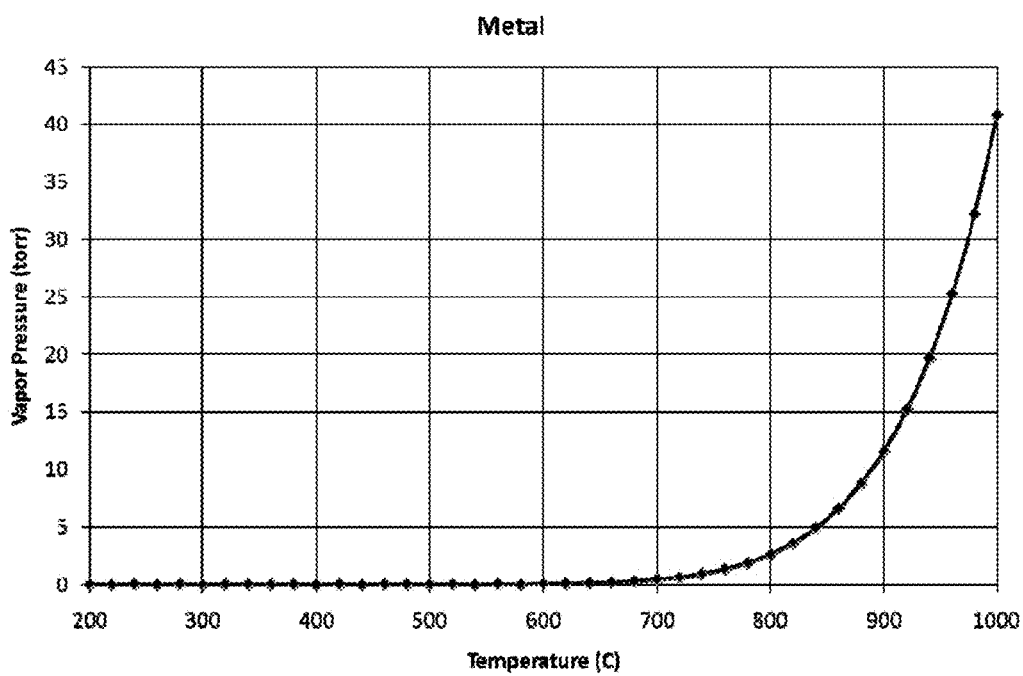
FIG. 3 is a vapor pressure curve for lithium metal as a function of temperature.

After the lithium deuteride source material 58 melts, the process vessel 50, the shim pot 46 (if used), and the center can 54 are further heated such that the lithium deuteride source material 58 reaches a temperature of at least 750° C. At that temperature, under near vacuum conditions, the molten lithium deuteride decomposes into lithium metal and deuterium. FIGS. 2 and 3 illustrate the comparative vapor pressures of deuterium in molten lithium deuteride (FIG. 1) versus the vapor pressure of lithium metal. At any temperature in the range of 700° C. to 1000° C., the vapor pressure of deuterium from lithium deuteride is ten to thirty times higher than the vapor pressure of lithium from lithium metal. Lithium deuteride decomposes when the vapor pressure of the deuterium content is above about 30 torr. This occurs at about 750° C., and, at that temperature, the vapor pressure of Li from lithium metal is about 1 torr. Consequently, at 750° C., deuterium is preferentially (almost exclusively) generated, with very little lithium vapor generated. Typically, at 750° C., deuterium generation occurs as fast as it can be pumped until all of the lithium deuteride in the lithium deuteride source material 58 has decomposed to lithium metal and deuterium.

Returning to FIG. 1, as the lithium deuteride decomposes into deuterium and lithium metal, the vacuum system 38 pulls the deuterium along paths 74 through the moderate zone 18. In embodiments where an inert gas sparge 63 is employed, the vacuum system 38 also pulls the inert gas sparge 63 through the moderate zone 18 and the cold zone 22.

The deuterium (and inert gas sparge 63, if present) flows out of the vacuum system 38 into an accumulator 94. Certain impurities may also be pulled into the accumulator 94. A deuterium membrane filter 98 (such as a side stream palladium filter) may be used to extract deuterium 102 (which is substantially pure $^1$H and (at least 20 percent)$^2$H after filtration) and store it in a deuterium storage compartment 114. The deuterium 102 may be piped out of the deuterium storage compartment 114 for use in a fuel cell process or for use in other devices or chemical processes. If an inert gas sparge 63 (such as the argon purge gas 62) is used, recovered inert gas 106 may be temporarily stored in an inert gas storage compartment 110. The recovered inert gas 106 may then be returned to the tank 64 and reused.

The just-concluded description of extraction of deuterium 102 from the lithium deuteride source material 58 completes the process application steps needed for some embodiments. In such embodiments, the thermal decomposition and distillation apparatus 10 may be reused for multiple repetitive operations by re-hydriding the lithium that remains in the hot zone 14 with deuterium. To do this, the hot zone 14 with the refined lithium metal in the process vessel 50 is heated to a temperature of about 800° C. (if it is not already at that temperature). Then deuterium (at approximately 16 psia) is introduced into the hot zone 14 from a source of deuterium 170, and the lithium metal is converted to lithium deuteride 58. With this approach, the thermal decomposition and distillation apparatus 10 provides a reusable, high density deuterium storage device. In such embodiments, the thermal decomposition and distillation apparatus 10 may be simplified by eliminating the shim pot 46 and eliminating elements described and discussed later herein such as the inclined deflector 78, the elements in the moderate zone 18, and the elements of the cold zone 22.

In some embodiments it is desirable to purify the liquid-phase lithium metal that remains in the process vessel 50 after extraction of the deuterium from the lithium deuteride. To do this, the process vessel 50, the shim pot 46 (if used), and the center can 54 are further heated to about 900° C. At that temperature, the vacuum system 38 is able to extract gaseous-phase lithium metal from the liquid-phase lithium in the hot zone 14. An inclined deflector 78 may be provided to keep molten gaseous-phase lithium metal from weeping to the sides of the radiation baffles 66, and falling back into the space between the shim pot 46 and the center can 54. The deflector 78 is typically inclined at an angle 82 that is at least 12 degrees. In embodiments where the shim pot 46, the process vessel 50, and the center can 54 are annular, the deflector 78 is generally conical-shaped. The use of the inert gas sparge 63 (e.g., the purge gas 62) encourages the formation of lithium vapor, and, because the lithium vapor is relatively heavy, the inert gas sparge 63 helps to float the lithium vapor up to the top and out of the liquid lithium where it is pulled by the vacuum system 38 into the cold zone 22.

The cold zone 22 typically includes a chiller 122, such as a counter flow gas-to-gas heat exchanger. The gaseous-phase lithium metal pulled into the cold zone 22 solidifies as solid-phase lithium metal in the cold zone 22. Some of the gaseous-phase lithium metal vapors passing through the moderate zone 18 may condense back to liquid-phase lithium metal in the moderate zone 18 before reaching the cold zone 22. This condensed liquid-phase lithium metal (lithium metal condensate) flows by gravity back down through the funnel-shaped portion 130 of the moderate zone 18 to the center can 54 in the hot zone 14. Upon its return to the process vessel 50, the condensed liquid-phase lithium metal is again converted to gaseous-phase lithium metal. Eventually all gaseous-phase lithium metal vapors pass through the moderate zone 18 and condense in the cold zone 22 where the lithium metal is trapped in the solid phase.

Figure 4:
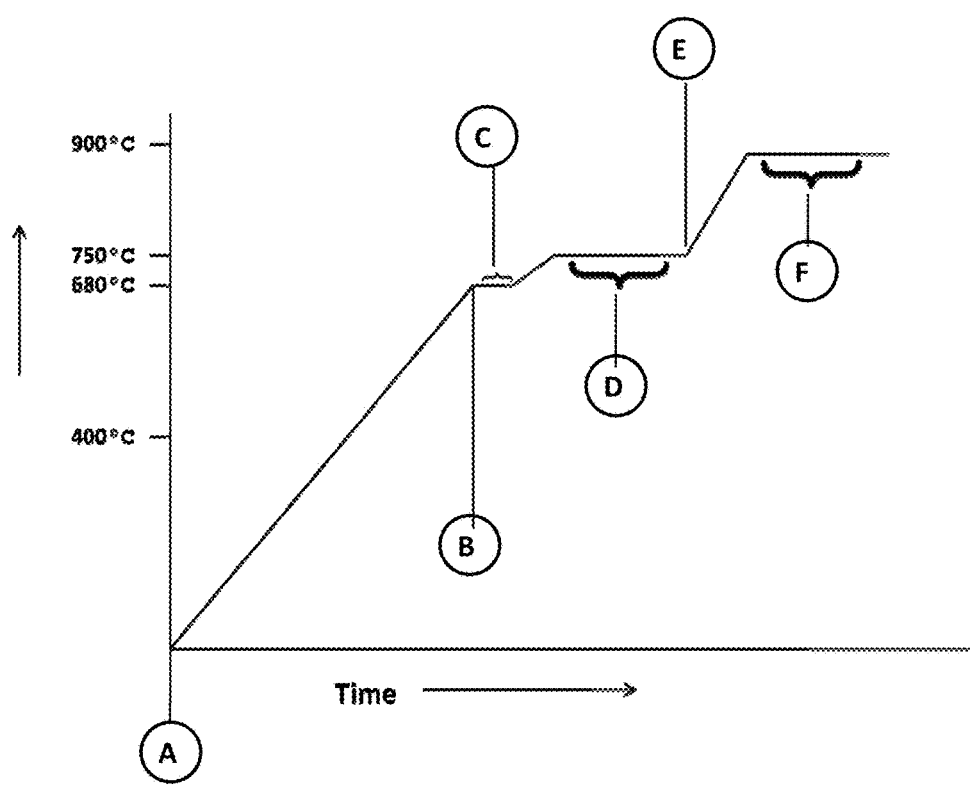
FIG. 4 is an exemplary temperature profile for extracting deuterium from lithium deuteride and purifying the resultant lithium.

FIG. 4 presents a summary of an exemplary temperature profile that may be used to extract deuterium and lithium metal from the lithium deuteride source material 58. The process starts at point "A" where the process vessel 50 is heated and a purge gas 62 is introduced through the valve 42. When the lithium deuteride source material 58 reaches a temperature of about 680° C. (at point "B") and is molten, the flow of the purge gas 62 is switched to a sparge gas 63 through the agitator 70. During the time interval "C" the lithium deuteride becomes molten. The temperature of the molten lithium deuteride is then increased to about 750° C. During time interval "D," the lithium deuteride decomposes to lithium and deuterium, and the deuterium is pumped away. When the lithium deuteride decomposition is complete (at time "E"), the molten lithium is further heated to about 900° C. where, during time interval "F," the lithium metal vaporizes and is frozen in the cold zone 22.

Upon completion of the thermal decomposition of lithium deuteride and the deposit of the solid-phase lithium metal in the cold zone 22, the gas pressure in the device of FIG. 1 approaches full vacuum (provided that the inert gas sparge 63, if used, is turned off). At that point, the valve 42 to the vacuum system 38 may be closed and the thermal decomposition and distillation apparatus 10 may be cooled, typically by simply turning off power to the thermal decomposition and distillation apparatus 10.

The highly purified lithium metal that has condensed in the cold zone 22 may be extracted by using heaters 146 to heat the cold zone 22 to a temperature above 180° C., the melting temperature of lithium metal. Supplemental heaters 150 may be applied to the moderate zone 18. The purified liquid-phase lithium metal runs down into the center can 54 of the hot zone 14 (which is now cold) through a cylinder 158, thereby providing refined lithium metal. The cylinder 158 has an end 162, and it beneficial to have the end 162 of the cylinder 158 terminate at an elevation that is below the top of the center can 54.

As previously noted, the thermal decomposition and distillation apparatus 10 may be recharged for repetitive operations by re-hydriding the refined lithium in the hot zone 14 with deuterium such that the refined lithium metal is converted to refined lithium deuteride. Alternately, the vapor distilled, ultra-high purity refined lithium metal may be removed from the process vessel 50 under inert conditions for other uses. In some embodiments, the thermal decomposition and distillation apparatus 10 is used as a reiterating lithium or lithium deuteride refining device, and in such embodiments the source of deuterium 170 may include deuterium 102 extracted from a prior decomposition of lithium deuteride.

In addition to various embodiments of apparatuses, the present disclosure provides methods of processing deuterium and lithium material. The methods typically involve heating a lithium deuteride source material that includes lithium deuteride to form liquid-phase lithium deuteride. The lithium deuteride source material is heated to a temperature that is typically in the range of 750° C. to 800° C. to form a liquid-phase lithium deuteride. A reduced ambient pressure over the liquid-phase lithium deuteride (such as provided by a vacuum pump) extracts deuterium and gaseous-phase lithium metal from the liquid-phase lithium deuteride as the lithium deuteride decomposes. The reduced ambient pressure also has a benefit of reducing the decomposition temperature of the lithium deuteride. Typically, the gaseous-phase lithium metal is condensed as solid-phase lithium metal. Sometimes, a lithium condensate portion of the gaseous-phase lithium may be captured and returned to the lithium deuteride source material as liquid-phase lithium condensate. The solid-phase lithium metal may be extracted from the cold zone by melting to form refined lithium metal, and the refined lithium metal may be hydrided using deuterium gas to form a re-charged lithium deuteride. The previously-described process steps for decomposing lithium deuteride may then be repeated one or more times using recharged lithium deuteride as the lithium material.

Some processes may involve retarding the formation of a barrier crust that may form adjacent the liquid-phase lithium deuteride. This retarding step may involve sparging the liquid-phase lithium deuteride with an inert gas such as argon, and/or it may involve agitating the liquid-phase lithium deuteride with an energy having a periodic waveform, such as ultrasonic energy.

Figure 5:
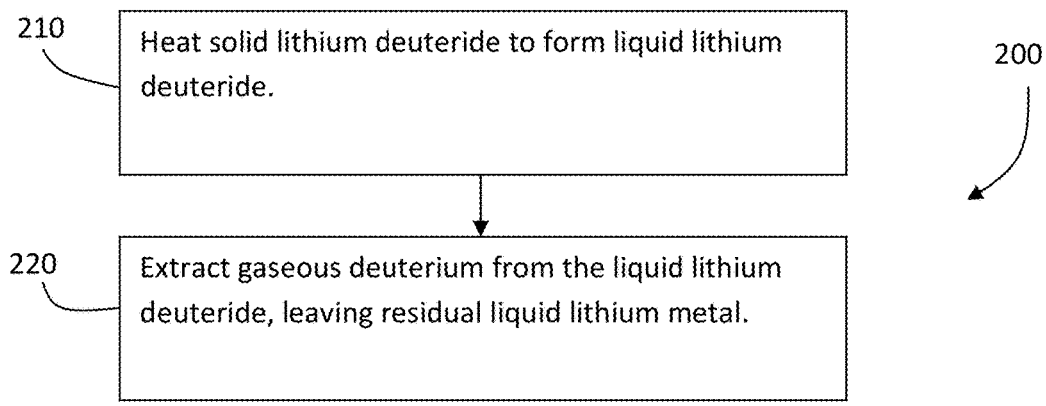
FIG. 5 is a flow chart depicting a method of producing deuterium.

FIG. 5 illustrates a process 200 for producing gaseous deuterium using, for example, the thermal decomposition and distillation apparatus 10 of FIG. 1. In step 210 solid lithium deuteride is heated to form liquid lithium deuteride. In step 220, the liquid lithium deuteride is further heated and gaseous deuterium is extracted from the liquid lithium deuteride, leaving residual liquid lithium metal.

Figure 6:
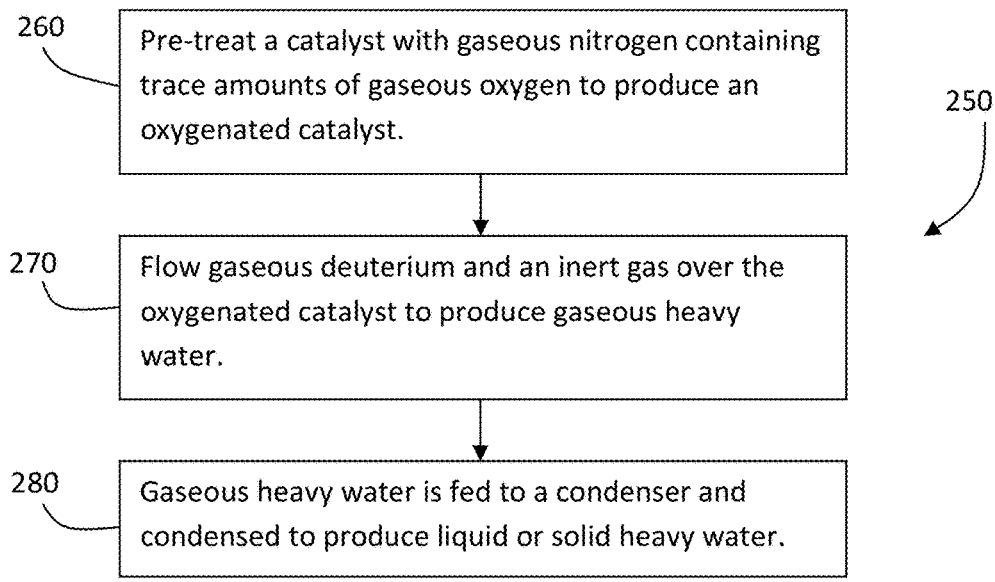
FIGS. 6, 8 and 10 are flow charts depicting methods of producing heavy water.

FIG. 6 illustrates a process 250 for the production of heavy water using deuterium such as the gaseous deuterium extracted in process 200 of FIG. 5 and/or the deuterium 102 from the accumulator 94 of apparatus 10 of FIG. 1. In step 260, a high purity air or a mixture of an inert gas (typically nitrogen) and gaseous oxygen is introduced into a catalytic reactor. The catalytic reactor typically has a packed bed of aluminum oxide spheres having surfaces that have been impregnated with a small percentage (typically 0.1%-0.5%) of either platinum or palladium. Such catalysts are referred to as "deoxo" catalysts because of their ability to remove oxygen from a gas stream. At the time of the present disclosure, such catalysts may be procured from Advanced Catalyst Systems, LLC, located in Maryville, Tenn. The catalyst disassociates the oxygen molecules from the inert gas, affixing oxygen atoms on the surface of the catalytic particles to provide an oxygenated catalyst, which makes the oxygen available for the reaction with deuterium to produce heavy water. Typically, when the catalyst is used for the production of heavy water, the catalyst is heated to a temperature of about 150° C.

In step 270, deuterium gas) is fed into the catalytic reactor. Optionally, an inert gas such as argon may be fed into the catalytic reactor with the deuterium. Mass flow controllers may be used to control the feed rate into the catalyst reactor. Heavy water is formed in the catalytic reactor as gaseous heavy water (steam).

In step 280 the gaseous heavy water is fed to a condenser where it is condensed, typically by using a shell and tube heat exchanger that is cooled by a chilled coolant. Depending on the temperature of the coolant and the residence time of the gaseous heavy water in the heat exchanger, the gaseous heavy water will be condensed to either a liquid or a solid (ice) form. The liquid or solid heavy water may then be stored in a sealed, inert container.

Figure 7:
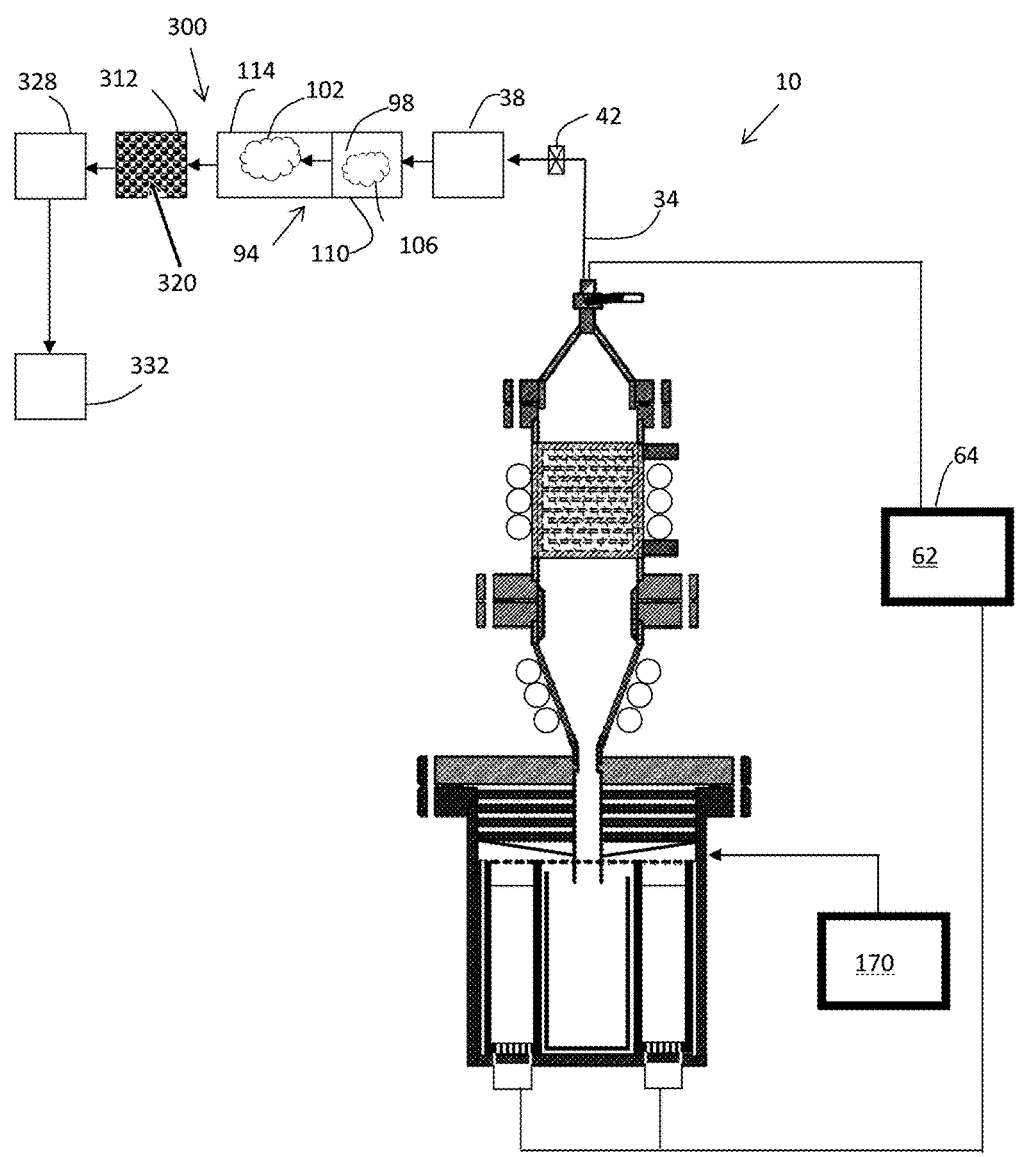
FIGS. 7, 9 and 11 are somewhat schematic cross-sectional views of apparatuses for producing heavy water.

FIG. 7 illustrates an apparatus 300 for production of heavy water that may be adapted for use of the process 250 of FIG. 6. The apparatus 300 includes the thermal decomposition and distillation apparatus 10 (depicted in FIG. 1) for production of deuterium 102. The deuterium 102 is fed into a catalytic reactor 312 that has a packed bed of aluminum oxide spheres 320 having surfaces that have been impregnated with a small percentage (0.1%-0.5%) of either platinum or palladium. Heavy water is formed in the catalytic reactor 312 as gaseous heavy water (steam), which is flowed to a condenser 328 and converted to liquid or solid heavy water. The liquid or solid heavy water is then conveyed to a sealed inert container 332 for storage.

Figure 8:
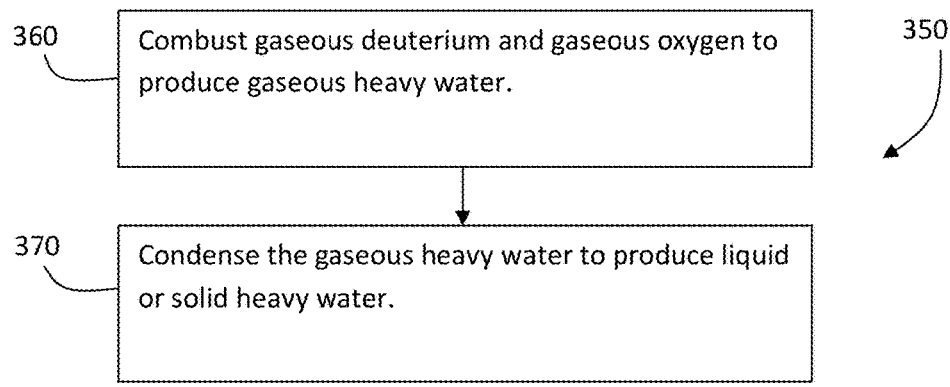

FIG. 8 depicts an alternate process 350 for production of heavy water. Process 350 converts deuterium gas to heavy water ($D_2O$) by combustion. Deuterium gas is a highly flammable gas and it will burn in air at a concentration between 4% and 75% by volume. The combustion process consists of two major steps: (1) a combustion step 360 and (2) a condensing step 370. During the combustion step 360, a compressor is typically used to deliver deuterium gas (such as the deuterium from the process depicted in FIG. 5 and/or such as the deuterium 102 from the accumulator 94 of apparatus 10 of FIG. 1) into a combustion chamber. Either dry air or oxygen is also introduced into this chamber. A spark source is typically used to ignite the two gases, initiating a combustion reaction. The heavy water product is produced in a gas phase (as steam). The product stream is then fed into a condenser where it is condensed as shown in step 370. The condenser is generally sized and configured such that the steam product is cooled to the liquid phase, although the condenser can be configured to freeze the heavy water. The heavy water is generally then collected and stored inside of a sealed, inert container.

Figure 9:
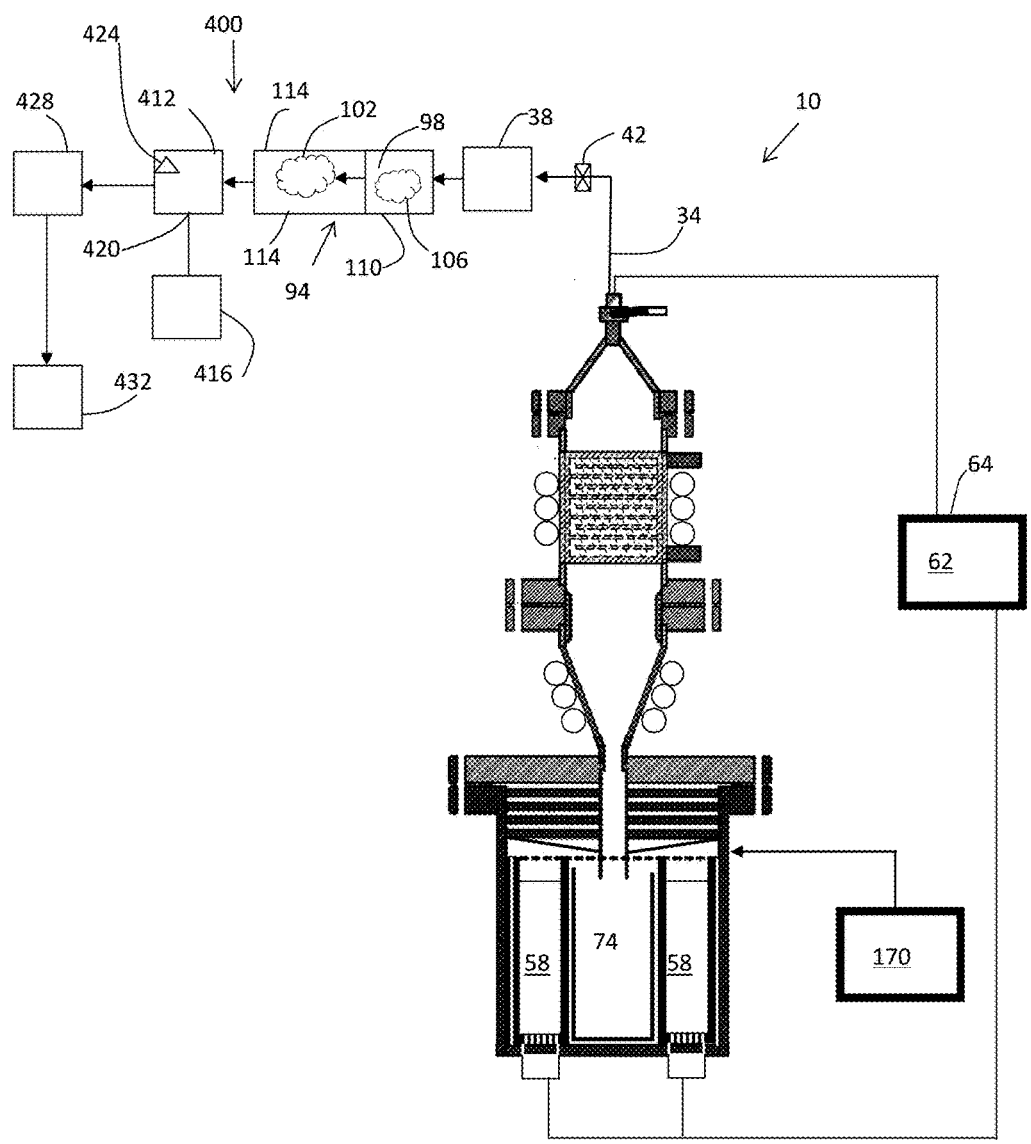

FIG. 9 illustrates an apparatus 400 for production of heavy water that may be adapted for use of the process 350 of FIG. 8. The apparatus 400 includes the thermal decomposition and distillation apparatus 10 (depicted in FIG. 1) for production of deuterium 102. The deuterium 102 is fed into a combustion chamber 412 that has a source of oxygen 416 that feeds dry air or other source of oxygen into the combustion chamber 412 through a port 420. Inside the combustion chamber is an ignition source 424 that initiates the burning of the deuterium. Heavy water is formed in the combustion chamber 412 as gaseous heavy water (steam), which is flowed to a condenser 428 and converted to liquid or solid heavy water. The liquid or solid heavy water is then conveyed to a sealed inert container 432 for storage.

Figure 10:
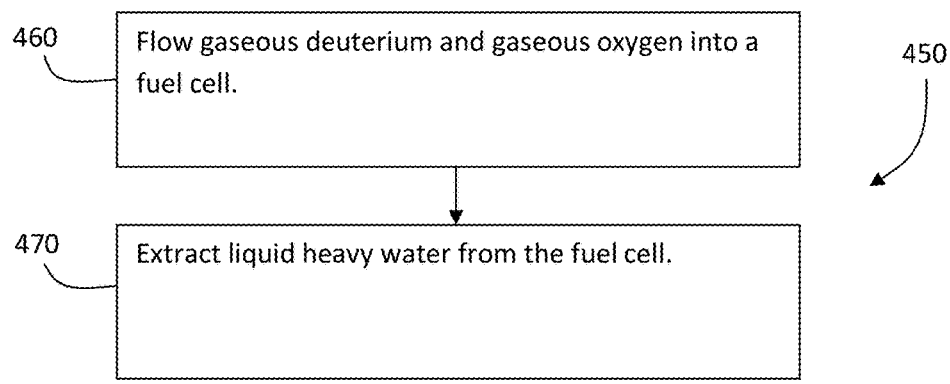

FIG. 10 illustrates a process 450 where a fuel cell is used for heavy water production. In this embodiment, deuterium gas (such as the deuterium from the process depicted in FIG. 5 and/or such as the deuterium 102 from the accumulator 94 of apparatus 10 of FIG. 1) is fed to a fuel cell, such as a PEM fuel cell. The acronym "PEM" is sometimes indicated as referring to a "Polymer Electrolyte Membrane" fuel cell and is sometimes indicated as referring to a "Proton Exchange Membrane," but either name refers to the same fuel cell. PEM fuel cells use a stored hydrogen fuel and oxygen from the air to produce electricity, with water being produced as a by-product. In step 460 of the embodiment of FIG. 10, deuterium gas (such as the deuterium from the process depicted in FIG. 5 and/or such as the deuterium 102 from the accumulator 94 of apparatus 10 of FIG. 1) is flowed into a PEM fuel cell (instead of ordinary hydrogen). Then, in step 470, heavy water is extracted from the fuel cell typically using a vacuum filtration system with electricity being produced as the "by-product."

Figure 11:
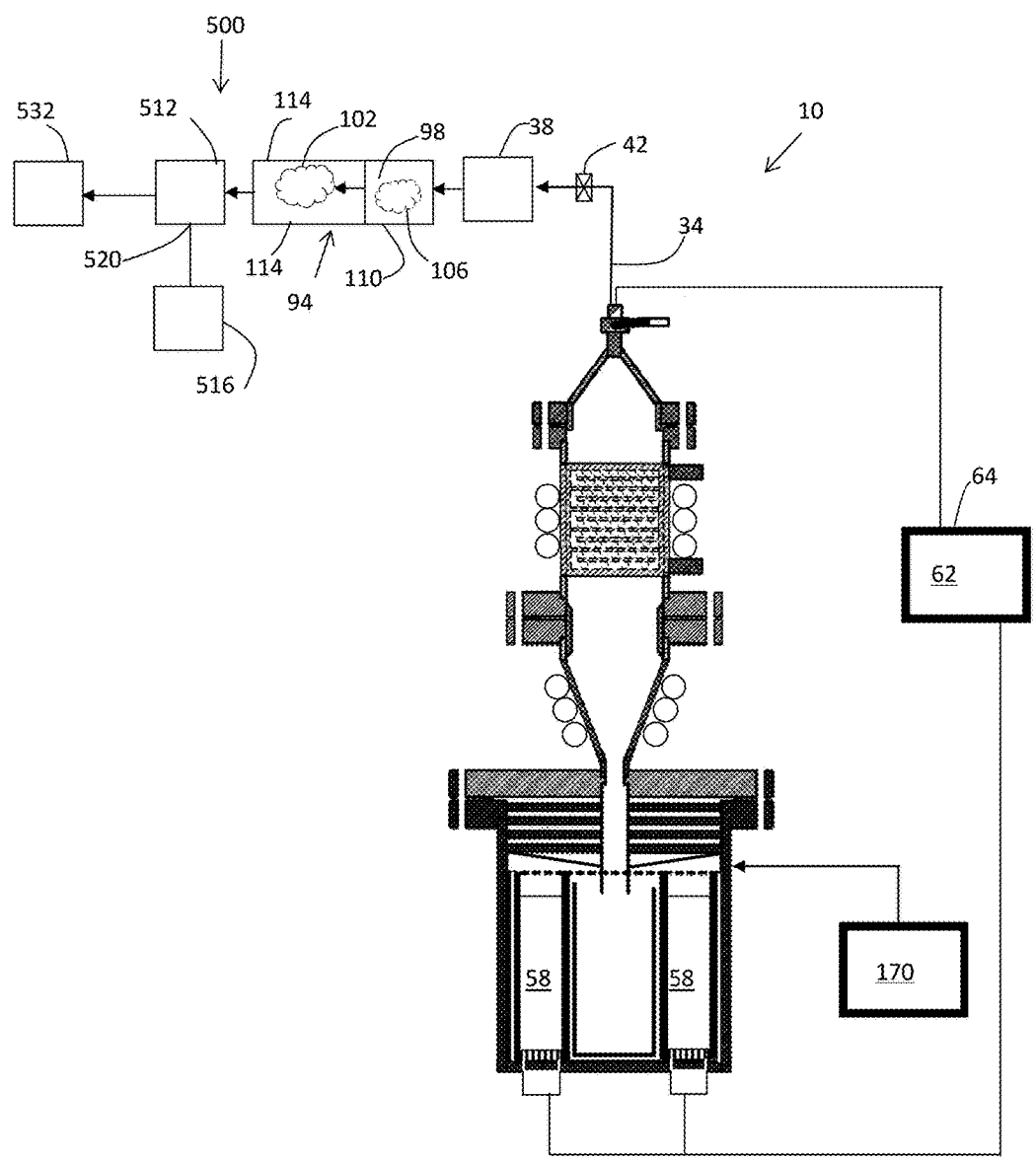

FIG. 11 illustrates an apparatus 500 for production of heavy water that may be adapted for use of the process 450 of FIG. 10. The apparatus 500 includes the thermal decomposition and distillation apparatus 10 (depicted in FIG. 1) for production of deuterium 102. The deuterium 102 is fed into a fuel cell 512. A source of oxygen 516 is provided for feeding ambient air or other source of oxygen into the fuel cell 512 through a port 520. Heavy water is formed in the fuel cell 512, which is flowed to a sealed inert container 532 for storage.

In summary, embodiments disclosed herein provide various methods and apparatuses for production of heavy water. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of producing heavy water comprising:
   heating solid lithium deuteride to form liquid lithium deuteride;
   extracting gaseous deuterium from the liquid lithium deuteride;
   combusting the extracted gaseous deuterium with gaseous oxygen to produce gaseous heavy water; and
   condensing the gaseous heavy water to produce liquid or solid heavy water.

2. A method of producing heavy water comprising:
   heating solid lithium deuteride to form liquid lithium deuteride;
   extracting gaseous deuterium from the liquid lithium deuteride;
   flowing the extracted gaseous deuterium into a fuel cell with gaseous oxygen; and
   extracting liquid heavy water from the fuel cell.

3. A method of producing heavy water comprising:
   heating solid lithium deuteride to form liquid lithium deuteride;
   extracting gaseous deuterium from the liquid lithium deuteride;
   treating a catalyst with inert gas and gaseous oxygen to produce an oxygenated catalyst;
   flowing the extracted gaseous deuterium over the oxygenated catalyst to produce gaseous heavy water; and
   condensing the gaseous heavy water to produce liquid or solid heavy water.

4. The method of claim 3 wherein the inert gas is nitrogen.

5. The method of claim 3 wherein the flowing step further includes flowing inert gas over the oxygenated catalyst.

* * * * *